United States Patent
Burton et al.

(10) Patent No.: US 9,274,923 B2
(45) Date of Patent: Mar. 1, 2016

(54) SYSTEM AND METHOD FOR STACK CRAWL TESTING AND CACHING

(75) Inventors: Felix Burton, San Mateo, CA (US); Peder Andersen, San Francisco, CA (US); Mitch Stanek, San Jose, CA (US)

(73) Assignee: WIND RIVER SYSTEMS, INC., Alameda, CA (US)

( * ) Notice: Subject to any disclaimer, the term of this patent is extended or adjusted under 35 U.S.C. 154(b) by 1179 days.

(21) Appl. No.: 12/054,546

(22) Filed: Mar. 25, 2008

(65) Prior Publication Data
US 2009/0248721 A1 Oct. 1, 2009

(51) Int. Cl.
G06F 9/44 (2006.01)
G06F 11/36 (2006.01)

(52) U.S. Cl.
CPC .................................. *G06F 11/3604* (2013.01)

(58) Field of Classification Search
None
See application file for complete search history.

(56) References Cited

U.S. PATENT DOCUMENTS

| | | | | |
|---|---|---|---|---|
| 6,035,123 A * | 3/2000 | Razdan et al. | | 717/155 |
| 7,260,692 B1 * | 8/2007 | Zahavi et al. | | 711/154 |
| 7,386,686 B2 * | 6/2008 | Wu et al. | | 711/147 |
| 7,526,422 B1 * | 4/2009 | Nemecek | | 703/28 |
| 7,631,249 B2 * | 12/2009 | Borde et al. | | 714/799 |
| 7,788,645 B2 * | 8/2010 | Agarwala | | 717/128 |
| 7,797,686 B2 * | 9/2010 | Agarwala et al. | | 717/128 |
| 7,987,393 B2 * | 7/2011 | Sohm et al. | | 714/45 |
| 2002/0038437 A1 * | 3/2002 | Hogdal et al. | | 714/25 |
| 2004/0010782 A1 * | 1/2004 | Moritz | | 717/151 |
| 2004/0205409 A1 * | 10/2004 | Wu et al. | | 714/38 |
| 2007/0198857 A1 * | 8/2007 | Gidalov | | 713/193 |
| 2009/0100413 A1 * | 4/2009 | Nash | | 717/124 |
| 2009/0144186 A1 * | 6/2009 | Debarre | | 705/37 |
| 2011/0072418 A1 * | 3/2011 | Kalamegham et al. | | 717/128 |
| 2011/0277037 A1 * | 11/2011 | Burke et al. | | 726/26 |

* cited by examiner

*Primary Examiner* — Evral Bodden
(74) *Attorney, Agent, or Firm* — Fay Kaplun & Marcin, LLP

(57) ABSTRACT

A method for extracting static information from user code, analyzing the static information to determine location expressions for program information and comparing the location expressions to reference location expressions of the user code. In addition, a system having a reading module configured to read and extract static information from user code, an analyzing module configured to analyze the static information to determine location expressions for program information and a comparison module configured to compare the location expressions to reference location expressions of the user code.

14 Claims, 3 Drawing Sheets

SYSTEM AND METHOD FOR STACK CRAWL TESTING AND CACHING

BACKGROUND

In a computing architecture utilizing stack-based memory allocation, stacks may reference regions within a memory where data is added/removed in a last-in-first-out ("LIFO") method. The stack may be used to store local variables that are used within a thread or application. The stack may be used to keep track of a point to which each subroutine should return control when execution is terminated. Typically, a program is subdivided into reusable parts called subroutines, or functions, wherein these subroutines may be called in different parts of the same program. When executed, these subroutines often reserve a section of the stack for exclusive use, called the subroutine's stack frame. Therefore, after executing the subroutine, the program may refer to a return address of the subroutine within its stack frame, in order to remember where the execution should return.

Within a typical computer system, each execution thread may have a reserved region of memory referred to as the stack for that thread. While an application executes a function or procedure, the thread may add data to the top of its stack. The adding of data to a stack may be referred to as "winding". Once the function or procedure has finished executing, the thread is responsible for removing that data from the stack. The removal of data from the stack may be referred to as "unwinding". Accordingly, if a region of memory resides on the stack of a thread, that memory may be defined as being allocated on the stack.

Stack crawling may be used in a debugger and/or other software analysis programs in order to interpret an application at specific points of execution. Specifically, within the stack of the thread, a program may crawl the stack in an attempt to find the objects being used by the application. Stack crawling may allow for implementation of several important language features, such as, for example, garbage collection, security, exception processing, etc. Furthermore, stack crawling may also be used for profiling a dynamic call chain. According to conventional methods for crawling the stack, the runtime needs a mechanism that maps a call site's address to the descriptor containing the call site (i.e., "the caller"). Conventional techniques for stack unwinding require the compiler to register the address ranges comprising a method with the managed runtime. The managed runtime maintains a data structure that maps instruction ranges to method descriptors. Furthermore, it is important to note that conventional stack crawling methods require the application to be running while the programmer performs the stack crawl.

SUMMARY OF THE INVENTION

A method for extracting static information from user code, analyzing the static information to determine location expressions for program information and comparing the location expressions to reference location expressions of the user code.

In addition, a system having a reading module configured to read and extract static information from user code, an analyzing module configured to analyze the static information to determine location expressions for program information and a comparison module configured to compare the location expressions to reference location expressions of the user code.

DETAILED DESCRIPTION

Figure 1A:
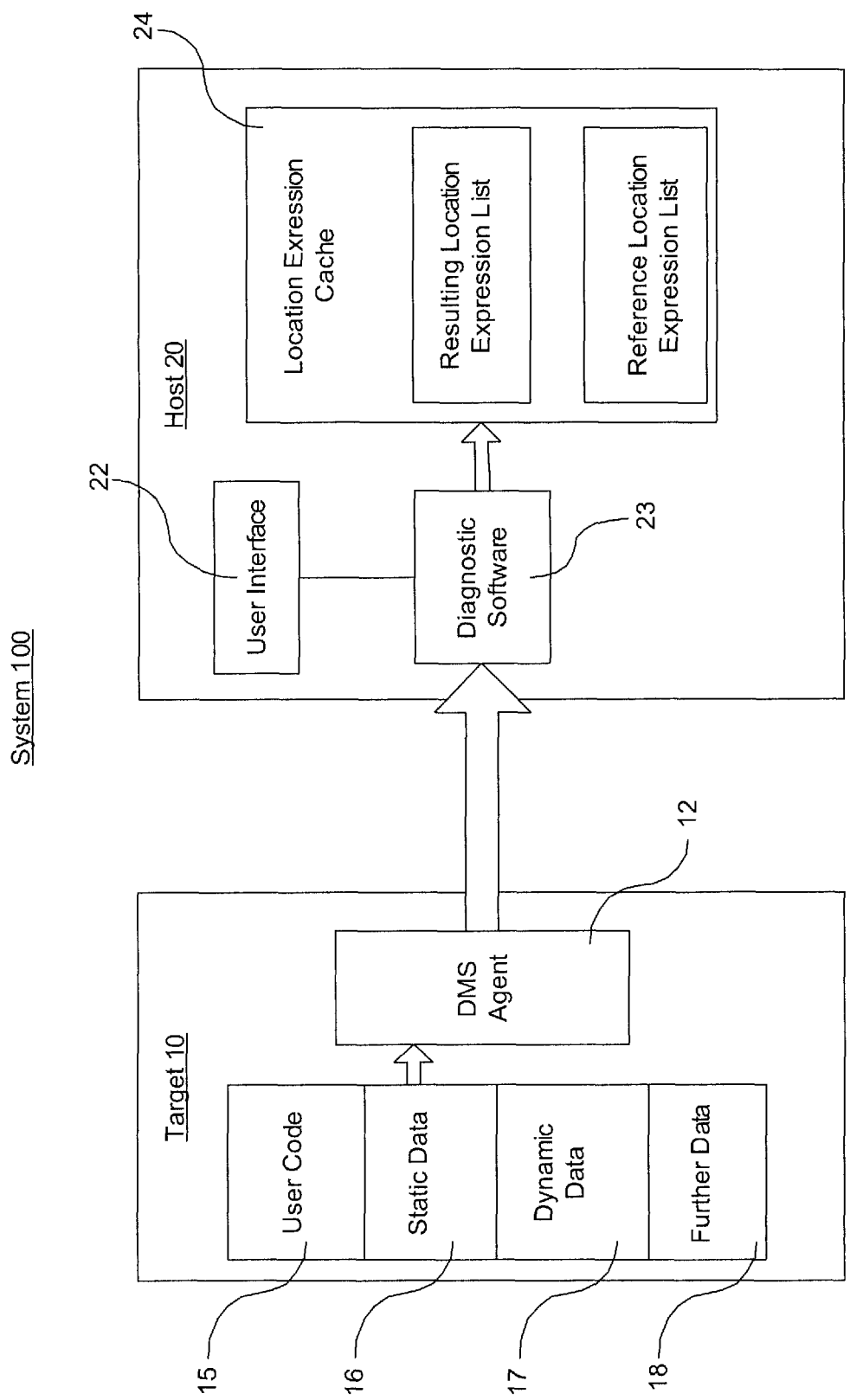
FIG. 1A shows an exemplary embodiment of a system for stack crawl testing user code on a target by a host according to the exemplary embodiments of the present invention.

The exemplary embodiments of the present invention may be further understood with reference to the following description and the appended drawings, wherein like elements are referred to with the same reference numerals. The exemplary embodiments of the present invention describe methods to perform stack crawling of an application while caching prior stack crawls. In general, the exemplary embodiments of the present invention allow for exercising the testability of a stack crawl algorithm without running the target application program or stack. The systems and methods according to an exemplary embodiment of the present invention may decouple dynamic information within the target application program or stack from static information within the program. Accordingly, the decoupled static information may be read and analyzed prior to executing the program or stack. Furthermore, the exemplary embodiments of the present invention allow for caching prior stack crawls, thereby improving the overall performance of the testing.

The exemplary embodiments will be described with reference to testing an application program, such as user code. However, those skilled in the art will understand that the exemplary embodiments of the present invention may be implemented as part of an operating system, or for any situation where a group of applications share a common stack-based memory. According to the exemplary embodiments of the present invention, the term memory may include, but is not limited to, any writeable medium that may be utilized by the application, such as, for example, RAM memory, disk memory, flash memory, bubble memory, any other non-volatile type of memory, etc. As will be described in great detail below, the stack crawl testing may be performed on a target device by a host device. Alternatively, it should be noted that the stack crawl testing may be performed within the host device by the host device.

FIG. 1A shows an exemplary embodiment of a system 100 for stack crawl testing user code 15 on a target 10 by a host 20 according to the exemplary embodiments of the present invention. In one embodiment, both the target 10 and the host 20 may be located in a lab environment, while in another embodiment, the target 10 and/or the host 20 may be in a field environment. For example, the target 10 may be deployed in a warehouse, office, etc., while the host resides in a laboratory or central server location. The target 10 and the host 20 may include conventional computing components such as a processor (e.g., a microprocessor, an embedded controller, etc.) and a memory (e.g., Random Access Memory, Read-only Memory, a hard disk, etc.). Communication between the target 10 and the host 20 occurs over a communication link, which may be a wired (e.g., Ethernet, serial port, Universal Serial Bus, etc.) or wireless (e.g., Bluetooth, IEEE 802.1x, etc.) connection.

The host 20 may include a user interface 22, a location expression cache 24 and diagnostic software 23. The user interface 22 enables a user (e.g., a software developer) to interact with the host 20 by receiving instructions and data requests. The user interface 22 may comprise any number of standard input and/or output devices, such as a keyboard, a mouse, a display, etc. Through the user interface 22, the developer may instruct the host 20 to transmit data to and/or from the target 10. The data may include expressions resulting from reading and analyzing user code 15 of the target 10. As will be discussed in detail below, these expressions may describe how to calculate values for a return address, a stack pointer, and other information as needed. The expression results data may be transmitted automatically from the target 10 to the host 20 (e.g., during predetermined intervals) or upon request by the developer. For example, the user may request to view a log file generated by the target 10 in order to view specific program output.

The diagnostic software 23 is a software development tool (e.g., such as workbench software, Wind River Scope-Tools, etc.) that may be used by the developer to create modify, and debug software programs. The diagnostic software 23 may comprise a software suite that includes any number of individual software development programs, such as a compiler, a debugger, a configurator, a source code analyzer, a text editor, etc. These individual programs may either be run independently of a running application or within a main development program. Using the diagnostic software 23, the developer may input data (e.g., such as program instructions and starting address) in order to generate resulting location expressions when performing a stack crawl on an execution thread within the user code 15. The performance of the diagnostic software 23 will be described in greater detail below. Accordingly, these resulting location expressions may be stored within the location expression cache 24.

The target 10 may include the user code 15, which comprises a program running in an operating system or a stand-alone program. The user code 15 may be written in any programming language (e.g., C/C++, Java, Assembly language, etc.). Furthermore, the user code 15 may be any program that the developer wishes to run on the target 10. For example, the user code 15 may be a main program or subroutine being developed for implementation on the target 10. According to the exemplary embodiments of the present invention, the user code 15 may include both static data 16 and dynamic data 17. The static data 16 may include information such as program instructions and starting address. As indicated by its name, the static data will remain constant at all times for the user code 15. The dynamic data 17 may include information such as register values and call stacks. Those skilled in the art will understand that the dynamic data 17 will change as the user code 15 is being executed. In addition, the user code 15 may include further data 18, such as source, header, library, object, and other files.

It turns out that in prior art stack crawlers, a majority of the code is dedicated to the reading and analysis of the static data 16. Thus, a large portion of the analysis code that is evaluating executing user code, could be performed without execution of the user code. In the exemplary embodiments of the present invention, the static data 16 may be decoupled from the dynamic data 17, thereby allowing analysis of the static data 16 without execution of the user code 15. This decoupling of the static data 16 from the dynamic data 17 allows the developer to test the static data 16 for the entirety of the user code 15. Those skilled in the art will understand that when testing the user code 15 as it is executing, only the static data 16 that is currently being executed may be analyzed. That is, not every line of user code 15 will be called during any sample execution of the user code 15. Thus, the prior art analysis of the static data 16 is limited to statistical stack crawls at random locations during the execution of the user code. However, in the exemplary embodiments of the present invention, the decoupling of the static data 16 from the dynamic data 17 allows the entirety of the static data 16 of the user code 15 to be analyzed.

Those skilled in the art will understand that a call stack (sometimes also referred to as a "call chain") is the program execution flow. For example, routine A( ) calls routine B( ), which will eventually, by virtue of execution being a LIFO stack model, return to A( ). Whereas a stack memory is the target's memory which may be used to assist with the flow of execution, and whose usage tends to mirror the same. The term "stack crawling" refers to the deconstruction/analysis of the call stack (or call chain) and in order to perform this, the location of the calling subroutine's fundamental values are computed. This location may reside in a specific thread's stack memory. This computation of location rather than a specific value allows the decoupling of call stack analysis from specific execution contexts (tasks, threads, processes).

Once decoupled, the static data 16 may be input to the diagnostic software 23 of the host 20. According to one exemplary embodiment of the present invention, the target 10 may include a Device Software Management ("DSM") agent 12 that communicates with the host 20 via the communication link. Specifically, the DSM agent 12 coordinates the sending and receiving of data, wherein instructions and data requests are received by the DSM agent 12 and processed accordingly. Data transmitted from the target 10 to the host 20 may first be placed in a buffer and sent when the data is ready for transmission and the host 20 is ready to receive the data. The DSM agent 12 may be implemented in hardware, software, or a combination thereof.

Thus, the diagnostic software 23 (e.g., a stack crawler) receives the static data 16 such as program instructions and starting addresses. The diagnostic software 23 may then analyze the static data to create expressions to describe how to calculate the values of various information such as return addresses, stack pointers, etc. Examples of the expressions may be, for example:

Value is (register x+offset);

Value at address (register x+offset);

Value is (constant);

Value is unknown; etc.

As can be seen from the above example, since the diagnostic software 23 may receive all the static data 16 for the user code 15, the diagnostic software 23 may evaluate the complete static data 16 for the user code 15. Thus, the exemplary embodiments are not limited to statistical evaluations of random portions of the code that happen to be executing when the analysis is performed. In addition, the decoupling of the static data 16 allows the analysis to be performed without having to execute the user code 15 on the target device 10.

The location expression cache 24 of the host 20 may store both the current results of the program instruction reading and analysis, as well as other types of data specified by the developer, such as prior resulting location expressions and reference location expressions. For example, each time that the diagnostic software performs the analysis of the static data 16 of the user code 15, the resulting expressions may be stored in the location expression cache 24. In this manner, the developer may have a historical record of the changes made to the user code 15 and how these changes have affected the performance of the user code 15 with respect to the static data. Because, as described above, each analysis may be performed on the entirety of the static data 16, the developer may be able to directly compare previous analysis results for previous versions of the user code 15 against the current results to see how changes have effected the location expressions. Thus, the exemplary embodiments allow a developer to improve performance of the analysis by making direct comparisons between previous analysis results and current analysis results for the entirety of the user code 15.

In another exemplary embodiment, the location expression cache 24 may also store a reference location expression list and a comparison may be made between the reference location expression list and the locations expressions determined by the current analysis. The reference location expression list may be derived from any number of sources. For example, the compiler within the diagnostic software 26 may generate reference location expressions for each instruction as part of the compilation. Alternatively, the reference location expressions may be derived from standardized debugging data formats, such as DWARF. In another exemplary embodiment, the location expression cache 24 may be pre-populated with location information for areas of the program where the stack crawl algorithm does not work, is slow, or for some other reason it may be beneficial. Once the reference location expressions are listed within the location expression cache 24, the diagnostic software 23 may perform comparisons between the results from the static data 16 and the references in order to stack crawl the user code 15 of the target 10.

In addition, the location expression cache 24 may also include user information, customer information, information regarding the target 10 (e.g., device type), parameter information regarding a business process, etc. The location expression cache 24 may be organized in any number of ways, including separate data structures for holding information corresponding to a specific target, a specific data type, etc. The location expression cache 24 also allows for both resulting and reference location expressions to be grouped together according to the specifications of the developer. For example, the developer may wish to group sub-components of a larger program together. Furthermore, the location expression cache 24 may be located on a writable memory, and may be accessed via the user interface 22.

It should be noted that in each of the exemplary embodiments, the location expression cache is shown as being resident on the host 20. However, it is also possible for the location expression cache 24 to be resident on the target 10. It may also be that there is a location expression cache 24 located on each of the host 20 and the target 10. A location expression cache 24 that is located on the target 10 may be useful for dynamic analysis of the target 10. In another exemplary embodiment, the location expression cache 24 may reside on another device that is separate from both the host 20 and the target 10.

Figure 1B:
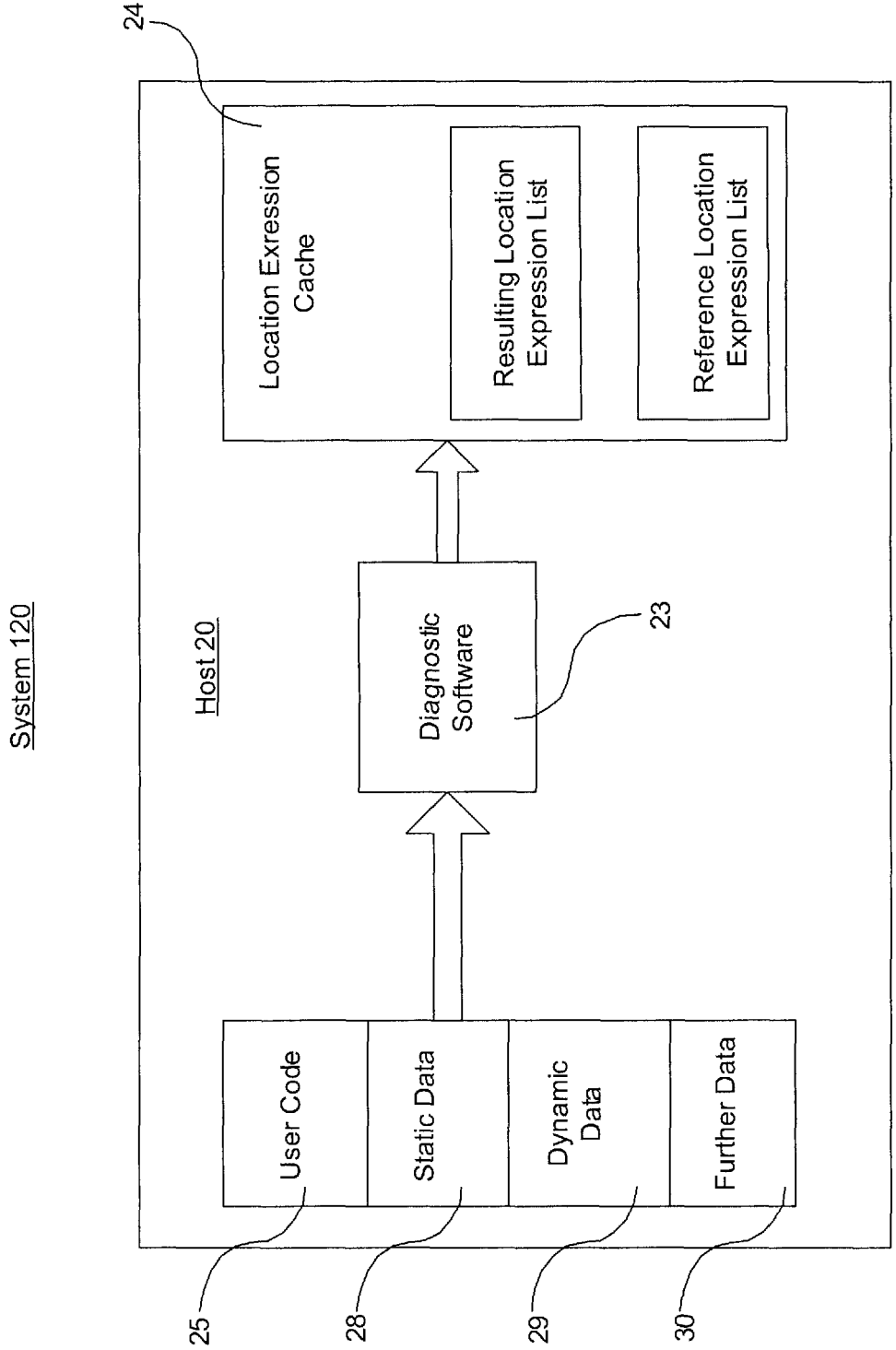
FIG. 1B shows an exemplary embodiment of a system for stack crawl testing user code on a host by the host according to the exemplary embodiments of the present invention.

FIG. 1B shows another exemplary embodiment of a system 120 for stack crawl testing user code 25 on the host 20 by the host 20 according to the exemplary embodiments of the present invention. As described above, the exemplary systems and methods of the present invention may be performed locally, within the host 20, itself, on internal user code 25. As also described above, the exemplary embodiments of the present invention do not require the user code 25 to be executing on a target device in order to analyze the static data. Thus, the user code 25 does not need to be downloaded and executing to perform the desired analysis. This allows for more efficient development and testing of the code because the developer may perform the desired analysis of the user code 25 in the development environment host 20 prior to downloading the user code 25 to a target device.

Similar to the user code 15 of the target 10 described in FIG. 1A, the user code 25 of the host 20 may include static data 28 (e.g., program instructions, starting addresses) and dynamic data 29 (e.g., register values, call stacks), as well as any further data 30. Accordingly, the host 20 may decouple the static data 28 from the dynamic data 28. Presuming the user code 25 does not utilize self-modifying code, the diagnostic software 23 receives the static data 28 as input. Upon performing analysis of the static data 28, the diagnostic software 23 may output resulting expressions that describe how to calculate the values of the return address, the stack pointers, and any further information needed.

As noted above, it is possible to test this user code 25 without executing the user code 25. Accordingly, the testing performed by the stack crawl of static data 28 of the user code 25 may cover the entire application by invoking the instruction reading and analysis functions of the diagnostic software 23 for each valid instruction in the application and comparing the resulting location expressions to the reference location expressions or results of previous analyses within the location expression cache 24.

Figure 2:
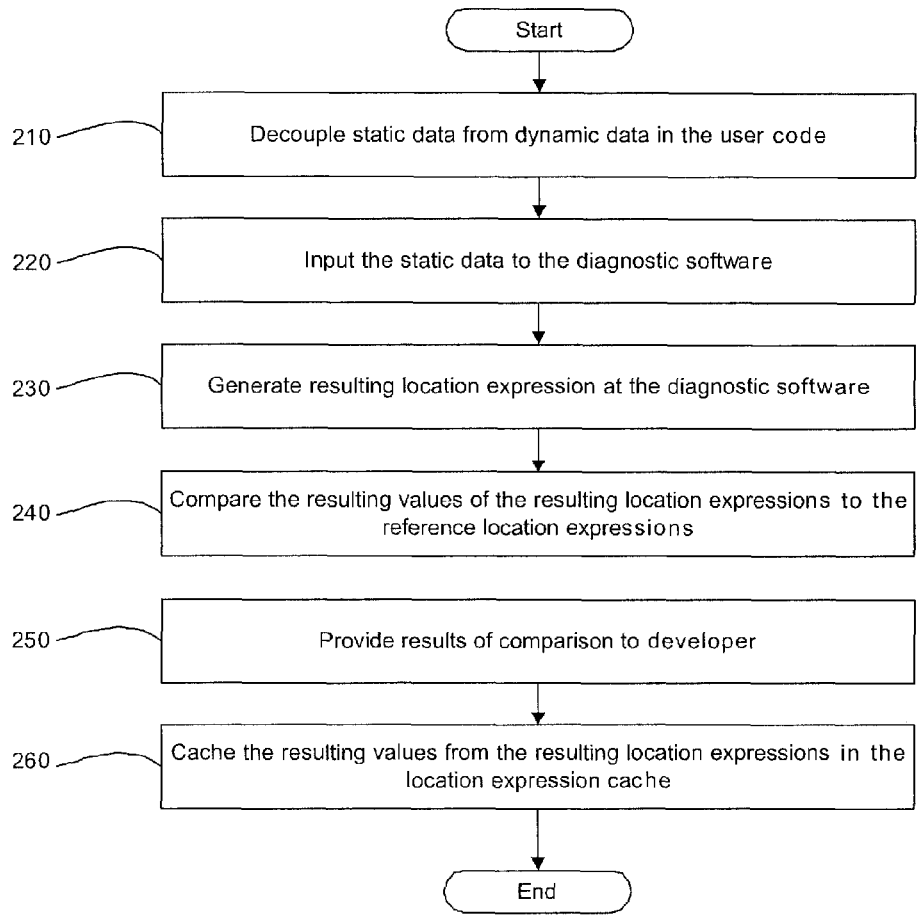
FIG. 2 shows an exemplary embodiment of a method for stack crawl testing according to the exemplary embodiments of the present invention.

FIG. 2 shows an exemplary embodiment of a method 200 for stack crawl testing according to the exemplary embodiments of the present invention. In step 210, the method 200 may decouple the static data (e.g., program instructions, starting addresses) from the dynamic data within the user code. Those of skill in the art will understand that the diagnostic software 23 may read the compiled user code (e.g., user code 15) and extract the static data included in the compiled code.

In step 220, the method 200 may input the static data into the diagnostic software. In step 230, the method 200 may generate a resulting location expression list at the diagnostic software based on the static data. Specifically, the resulting expressions may describe how to calculate values for the return addresses, the stack pointers, and any further information needed.

In step 240, the method 200 may compare resulting values from the resulting expressions to a predetermined reference location expression list or previous analyses results within the location expression cache. In step 250, the method may provide the results of the comparison to the developer. For example, the results may be displayed via the user interface 22 to the developer, the results may be printed, etc. In step 250, the method 200 may cache the resulting values from the performed resulting expressions in the location expression cache 24. By enabling the caching of prior stack crawls, the list of reference location expression may expand, thereby improving the performance of subsequent stack crawls.

Those skilled in the art will also understand that the above described exemplary embodiments may be implemented in any number of manners, including, as a separate software module, as a combination of hardware and software, etc. For example, diagnostic software 23 may be a program containing lines of code that, when compiled, may be executed on a processor. It will be apparent to those skilled in the art that various modifications may be made in the present invention, without departing from the spirit or scope of the invention. Thus, it is intended that the present invention cover the modifications and variations of this invention provided they come within the scope of the appended claims and their equivalents.

What is claimed is:
1. A method, comprising:
communicating, by a processor of a host, with a target having a target memory storing user code;

receiving, by the processor when the user code is not executing, first information from the user code, wherein the first information is only static information from the user code and wherein the first information is all of the static information from the user code, wherein the static information is data that remains constant when the user code is executed by the target, wherein the static information includes one of program instructions and starting addresses;

storing the static information in a location expression cache of a host memory of a host, wherein the host is separate from the target;

analyzing, by the processor when the user code is not executing, the static information to determine location expressions for program information, wherein the analyzing is performed without executing the user code, wherein the location expressions include a determination of one of a register value plus a corresponding offset, a constant value and an unknown value; and comparing, by the processor, the location expressions to reference location expressions of the user code.

2. The method of claim 1, wherein the program information includes one of return addresses and stack pointers.

3. The method of claim 1, wherein the reference location expressions include one of location expressions of a previous analysis and calculated location expressions based on the user code.

4. The method of claim 3, wherein the calculated location expressions are calculated based on one of a compiling of the user code and debug information of the user code.

5. The method of claim 1, wherein the extracting and analyzing are performed for the entirety of the user code.

6. The method of claim 1, further comprising:
providing, by the processor, results of the comparison to a user.

7. The method of claim 1, further comprising:
storing, by the processor, the location expressions in the host memory.

8. A system, comprising:
a host memory including a location expression cache;
a processor in communication with a target, the processor configured to execute a set of modules stored on the host memory, wherein the host memory includes:
a reading module configured to read and extract first information from user code stored in a target memory of the target when the user code is not executing, wherein the first information is only static information from the user code and wherein the first information is all of the static information from the user code, wherein the static information is data that remains constant when the user code is executed by the target;
a storing module configured to store the static information in the location expression cache;
an analyzing module configured to analyze the static information to determine location expressions for program information, wherein the analyzing is performed without executing the user code, wherein the program information includes one of return addresses and stack pointers and wherein the location expressions include a determination of one of a register value plus a corresponding offset, a constant value and an unknown value; and
a comparison module configured to compare the location expressions to reference location expressions of the user code.

9. The system of claim 8, wherein the static information includes one of program instructions and starting addresses.

10. The system of claim 8, wherein the reference location expressions include one of location expressions of a previous analysis and calculated location expressions based on the user code.

11. The system of claim 10, wherein the calculated location expressions are calculated based on one of a compiling of the user code and debug information of the user code.

12. The system of claim 8, further comprising:
a results module configured to provide results of the comparison to a user.

13. The system of claim 8, wherein the storage module is further configured to store the location expressions.

14. A system comprising a host memory storing a set of instructions and a processor configured to execute the instructions, the set of instruction being operable to:
communicate with a target having a target memory storing user code;
receive first information from the user code when the user code is not executing, wherein the first information is only static information from the user code and wherein the first information is all of the static information from the user code, wherein the static information is data that remains constant when the user code is executed by the target, wherein the static information includes one of program instructions and starting addresses;
store the static information in a location expression cache of a host memory;
analyze, when the user code is not executing, the static information to determine location expressions for program information, wherein the analyzing is performed without executing the user code, wherein the location expressions include a determination of one of a register value plus a corresponding offset, a constant value and an unknown value; and
compare the location expressions to reference location expressions of the user code.

* * * * *